United States Patent
Kible et al.

(10) Patent No.: US 6,807,263 B2
(45) Date of Patent: Oct. 19, 2004

(54) PROCESS AND DEVICES FOR CONFIGURING SERVICES IN A TELECOMMUNICATION NETWORK

(75) Inventors: Peter Kible, Sachsenheim (DE); Frank Kible, Kornwestheim (DE)

(73) Assignee: Alcatel, Paris (FR)

( * ) Notice: Subject to any disclaimer, the term of this patent is extended or adjusted under 35 U.S.C. 154(b) by 610 days.

(21) Appl. No.: 09/848,407

(22) Filed: May 4, 2001

(65) Prior Publication Data

US 2001/0044763 A1 Nov. 22, 2001

(30) Foreign Application Priority Data

May 20, 2000 (DE) .......................................... 100 25 137

(51) Int. Cl.⁷ .............................................. H04M 3/42
(52) U.S. Cl. ........................... 379/201.01; 235/462.01; 235/462.14; 379/201.02; 379/201.03
(58) Field of Search ..................... 235/462.01, 462.05, 235/462.14; 379/201.01, 201.02, 201.03, 201.05

(56) References Cited

U.S. PATENT DOCUMENTS

| | | | | |
|---|---|---|---|---|
| 4,947,028 A | * | 8/1990 | Gorog | .................... 235/380 |
| 5,056,019 A | * | 10/1991 | Schultz et al. | ................ 705/14 |
| 5,216,228 A | * | 6/1993 | Hashimoto | ................... 235/375 |
| 5,288,976 A | * | 2/1994 | Citron et al. | ............... 235/375 |
| 5,465,291 A | * | 11/1995 | Barrus et al. | .............. 379/67.1 |
| 5,748,899 A | * | 5/1998 | Aldrich | ...................... 709/222 |
| 5,978,772 A | * | 11/1999 | Mold | .......................... 705/16 |
| 6,144,848 A | * | 11/2000 | Walsh et al. | ................ 455/419 |
| 6,202,060 B1 | * | 3/2001 | Tran | .............................. 707/3 |
| 6,243,447 B1 | * | 6/2001 | Swartz et al. | ............ 379/93.12 |
| 6,393,408 B1 | * | 5/2002 | Mosher et al. | ................ 705/28 |
| 6,687,346 B1 | * | 2/2004 | Serbin et al. | ............ 379/93.12 |

* cited by examiner

Primary Examiner—Bing Q. Bui
(74) Attorney, Agent, or Firm—Sughrue Mion, PLLC

(57) ABSTRACT

A process for configuring a service that is to be provided for a subscriber (SUB) by a telecommunication network (NW), a barcode tagger (TAG) for same, a configuration module (KM) for same, a configuration device (KMP) for same, a data entry module (INM) for same, as well as a data entry device (IN) for same. In the process, a barcode (BC) is assigned to the service that is to be provided, wherein the barcode (BC) is read by a data entry device (IN) of a barcode tagger (TAG). The data entry device (IN) transmits barcode data (BDA) determined from the barcode (BC) to a configuration device (KMP) of the telecommunication network (NW) and the configuration device (KMP) configures the service for the subscriber (SUB) by means of the barcode data (BDA).

18 Claims, 1 Drawing Sheet

PROCESS AND DEVICES FOR CONFIGURING SERVICES IN A TELECOMMUNICATION NETWORK

BACKGROUND OF THE INVENTION

The present invention concerns a process for configuring a service that is to be provided for a subscriber by a telecommunication network, a barcode tagger for same, a configuration module for same, a configuration device for same, a data entry module for same, as well as a data entry device for same.

If a subscriber wishes to use a new telecommunications service, for example in relation to the provision of a new terminal, he has to book the service with a service provider, in a separate process. For example, typical scenarios are as follows:

A customer purchases a new telephone in a retail outlet, but does not yet have any subscriber line to allow the telephone to be used on a telecommunication network. Following the purchase, the customer, as a new subscriber to the telecommunication network, then has to register with a service provider. This not only involves some expense, but is also annoying to the new subscriber because he usually has to wait a few days until a subscriber line is connected for him.

In another example, the customer purchases an ISDN (Integrated Services Digital Network) telephone or an ISDN adapter for connecting a personal computer to an ISDN telecommunication network, but has only an analogue subscriber line. The customer can use his new terminals as a ISDN subscriber only after a separate request to switch he analogue subscriber line to ISDN.

Even if a subscriber just wants to book a new service for an existing subscriber line, for example callback on busy, he has to tediously arrange this by means of a written or verbal request to the service provider for his subscriber line.

The known process is laborious and prone to errors, both for the service provider, as well as for the operator of the subscriber line, since he always has to enter the details of the (new) subscriber in a configuration system of the telecommunication network, for example via an input interface, a service management system of a so-called telecommunications management network (TMN) and/or at an operator console of a switching center which attends the subscriber's line.

SUMMARY OF THE INVENTION

The object of the present invention is therefore to configure in a simple and reliable manner a service that is to be provided for a subscriber by a telecommunication network.

This object is achieved by a process for configuring a service to which a barcode is assigned and which is to be provided by a telecommunication network, the barcode is read by a data entry device of a barcode tagger, the data entry device of a configuration device of the telecommunication network transmits barcode data determined from the barcode and the configuration device configures the service for the subscriber by means of the barcode data.

The object is further achieved by a novel barcode tagger, a novel configuration module a novel configuration device, a novel data entry module, as well as a novel data entry device.

The invention is based on the idea that an unambiguous barcode that is read in at a retail outlet via a data entry device, in particular a point-of-sale scanner equipped according to the invention, is assigned to the service that is to be provided for a subscriber by a telecommunication network. The barcode can, for example, be attached to a terminal that is being purchased at the retail outlet. From the barcode the data entry device determines barcode data which it then transmits to a configuration device of the telecommunication network, for example to a control center of a telecommunications management network (TMN). This configuration device checks the barcode data, determines configuration data and, using the configuration data, configures the facilities of the telecommunication network involved in the service that is to be provided, for example switching centers, so-called service control points (SCP) for controlling service functions of an intelligent network (IN), access servers for the Internet, and the like.

The entire sales and configuration process is handled very quickly, conveniently and reliably since the entire active chain from the reading of the barcode to the configuration of the service takes place automatically without any operator intervention. The service is immediately available to the subscriber.

Further advantages of the invention are revealed in the dependent claims and in the description.

In a variant of the invention, an accounting device, for example a credit card accounting device, which receives the barcode data from the data entry device and determines an account sum, is assigned to the data entry device. Usefully, the accounting device acknowledges successful debiting of the account sum from an account of the subscriber to the data entry device and/or the telecommunication network, so that the service is configured for the subscriber only on completion of the payment transaction.

Advantageously, the accounting device, the data entry device or the configuration device transmits the barcode data or call charge configuration data determined from them, which contain the subscriber's bank account number, for example, to a call charge billing computer of the telecommunication network, so that the running costs of the service recently set up can be immediately charged by the telecommunication network. Due to this type of close coupling of the call charge billing units of the telecommunication network, that is to say the call charge billing computer and the configuration device on the one hand, with the sales devices, that is to say the data entry device and the accounting device on the other hand, special tariffs can be conveniently billed in conjunction with a new terminal provided with a barcode according to the invention. For example, special conditions for the use of the service can be arranged with the subscriber on purchasing a predetermined type of terminal as well as the service assigned to this terminal, or on the purchase of a service via a predetermined retail outlet.

The newly set-up service can be activated directly by the data entry device, or only after the subscriber has sent a relevant release code to the telecommunication network. For example, to do this, the subscriber sends a secret number from his terminal that is connected to the telecommunication network, using the DTMF (Dial Tone Multi Frequency) method.

In addition to the standardised recording of barcode data of a service via a barcode assigned to the latter, individual subscriber data specific to the respective subscriber, for example a directory number and/or a subscriber account number, can also be registered via the data entry device and transmitted to the configuration device. The subscriber data can be entered in the data entry device via a keyboard or preferably via a voice recognition system, for example.

BRIEF DESCRIPTION OF THE DRAWING

The invention and its advantages are described below by way of an exemplary embodiment and with the aid of the drawing, in which.

DETAILED DESCRIPTION OF THE INVENTION

Figure 1:
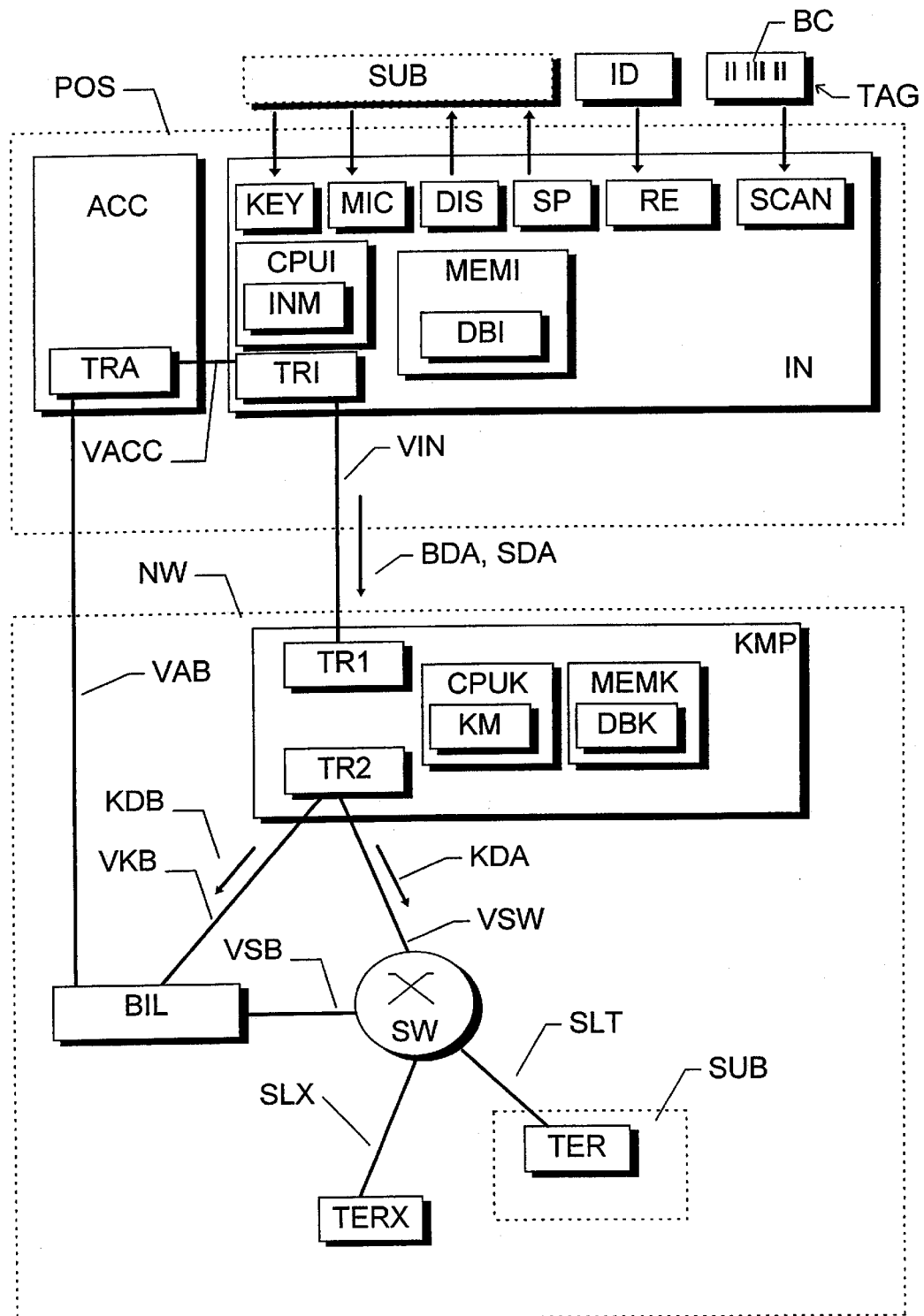
FIG. 1 shows an exemplary, very schematic arrangement for performing the invention, having a data entry device IN, an accounting device ACC, a configuration device KMP, and a barcode tagger TAG.

Of a telecommunication network NW, FIG. 1 shows a switching center SW operating as a local switching center with a terminal TERX connected via a wire or wireless subscriber line SLX, a configuration device KMP connected to the switching center SW via a circuit VSW, and a call charge billing computer BIL that is connected via a circuit VSB to the switching center SW, and via a circuit VKB to configuration device KMP. The circuits VKB, VSW and VSB can, for example, be permanently constructed on a LAN (Local Area Network), a WAN (Wide Area Network) or a signalling network of the telecommunication network NW, or constructed as required. The telecommunication network NW is, for example, an ISDN (Integrated Services Digital Network) telecommunication network, a mobile radio telecommunication network or a mixed voice and data network and also has other trunk circuits, switching centers and front-end equipment, which for the sake of clarity are not shown. The switching center SW also controls other subscriber lines, not shown. The telecommunication network NW which in the present case is operating as a so-called intelligent network, as well as the switching center SW operating here as a so-called service switching point (SSP), provide telecommunication services for these subscriber lines, for example voice or data circuits, as well as telecommunication services of an intelligent network.

The configuration device KMP is an operational computer of a central operational computer system of a telecommunications management network (TMN) which, apart from the configuration device KMP, also has other interconnected and partially redundant operational computers, not shown. The configuration device KMP configures services of the telecommunication network NW, by sending configuration data required for the respective service to the devices of the telecommunication network NW involved in the provision of the service, but for the most part not shown in FIG. 1.

The configuration device KMP can also be a stand-alone computer, for example an operator's console computer assigned to the switching center SW, or integrated in the switching center SW. The configuration device KMP can also be part of facilities, for example access computers or service control points, not shown.

The configuration device KMP has connection means TR1 and TR2, control means CPUK and memory means MEMK. The configuration device KMP can be a server that runs on a UNIX operating system or a Windows NT operating system. The configuration device KMP transmits and receives data on the circuits VKB and VSW via the connection means TR2 that is, for example, an Ethernet interface card. The configuration device KMP transmits and receives data from a data entry device IN on a circuit VIN via the connection means TR1 that is, for example, an ISDN adapter or a modem. The control means CPUK is a processor or a cluster of processors, that executes the instructions of an operating system that is stored in the memory means MEMK. Furthermore, program code sequences of program modules that are executed by the control means CPUK and control the functions of the configuration device KMP, are stored in the memory means MEMK which are comprised of a hard disk or RAM chips, for example. The connection means TR1 and TR2, the control means CPUK and the memory means MEMK are interconnected by circuits that are not shown in FIG. 1.

The data entry device IN and an accounting device ACC are assigned to a point-of-sale unit POS at which telecommunication services are sold on their own or in conjunction with telecommunication terminals. In addition to the functions to be explained in more detail below, the data entry device IN and the accounting device ACC can also fulfil the functions of a cash register.

An essential component of the data entry device IN, which is substantially constructed as a personal computer, is a scanner SCAN used as the reading means for reading the barcodes. The data entry device IN has connection means TRI acting as transmitting and receiving means, which involves a modem or an ISDN adapter, for example. With the connection means TRI, the data entry device IN can establish the circuit VIN to the configuration device KMP via the telecommunication network NW and transmit data, for example via the V.24 standard of the ITU (International Telecommunication Union) or via TCP/IP (Transmission Control Protocol/Internet Protocol). Furthermore, the data entry device IN is connected to the accounting device ACC with the aid of the connection means TRI via a circuit VACC designed as an Ethernet circuit, for example.

Moreover, the data entry device IN has control means CPUI and memory means MEMI. The control means CPUI is a processor with which program code stored in the memory means MEMI can be executed by an operating system running the data entry device IN, and by program modules. The memory means MEMI is a hard disk or RAM chips, for example. Furthermore, the data entry device IN has display means DIS, input means KEY as well as a card reader RE for reading personal data stored on chip cards or magnetic cards, for example on medical cards or credit cards. The display means DIS is for example a computer monitor or an LCD (liquid crystal display). The input means KEY can be a keyboard or a mouse. Furthermore, the data entry device IN has a loudspeaker SP and a microphone MIC, with which voice output or input is possible. The components of the data entry device IN are interconnected by connections which are not shown.

At the point-of-sale unit POS a subscriber SUB selects a new terminal TER, for example an ISDN telephone. This is intended to be connected to a subscriber line SLT already operated by the switching center SW as an analogue subscriber line. With the aid of a barcode BC that is attached to the terminal TER or its packaging, not shown, at least one telecommunication service which the telecommunication network NW can provide in conjunction with the terminal TER can be identified. In the present case, the barcode BC identifies the terminal TER as an ISDN terminal. The terminal TER, its packaging, an adhesive label or a card with the barcode BC, displayed at the point-of-sale unit, act as the barcode tagger TAG. The barcode BC can also represent other data identifying the terminal TER, for example its manufacturer and type, as well as data of non-standard service functions specially tailored to the construction of the terminal TER. The manufacturer of the terminal TER can be identified, for example, via a barcoded so-called international location number (ILN) and the type via an international article numbering system (EAN). Further details of a possible construction of a barcode, for example country identification numbers, check codes, codes definable according to quantity or number of items, numbers of dispatch units (NVE) can be obtained for example from the Centrale fur Cooorganisation GmbH (CCG, Maarweg 133, 50825 Cologne, http://www.ccg.de). Other barcode systems by which the barcode BC can be constructed are, for example the so-called "128 code" or the so-called "Interleave 2 from 5" code. Furthermore, a barcode system can also be specially defined for the barcode BC.

It is also possible for an ILN to be specially reserved for telecommunication services in general and for a specific telecommunication service and its manufacturer and/or provider to be identified via the EAN.

In addition to the above-mentioned construction according to the CCG scheme, the barcode BC can also be constructed according to an independent scheme specially defined for telecommunication services. Furthermore, several barcodes can be applied to the barcode tagger TAG, each barcode then being assigned to a telecommunication service and preferably in addition to each barcode, words and/or symbols briefly explaining which service the barcode stands for. In each case, however, the respective barcode makes the service clearly identifiable.

The barcode BC can also be constructed in modular blocks so that in this case the terminal TER can be assigned not only to a manufacturer "X" by a first barcode block, but can also be identified in a second barcode block as an ISDN terminal. Moreover, it is made obvious by means of a third barcode block that type 3 UUS3 (UUS=User-to-user signalling) text transmission as well as the "Brokering" telecommunication service, for example, are also possible with the terminal TER.

The barcode is read in by the scanner SCAN. This transmits the barcode BC to the control means CPUI which executes the program code of a data entry module INM. The data entry module INM is a program module that controls the data entry device IN for registering and evaluating the barcode BC. The data entry module INM reads the barcode by means of a read function. An evaluation and transmitting function then interrogates barcode data BDA assigned to the barcode BC from data stored in the program code of the data entry module INM or from a database DBI stored in the memory means MEMI. In this case the barcode BC is converted into a numerical sequence for example. However, it is also possible, per telecommunication service, for the barcode data BDA to contain an identifier, consisting of numbers and/or letters, that is already checked each time for plausibility by the data entry module INM. Furthermore, instead of the barcode BC, the barcode data BDA can also contain data supplementing this barcode that is assigned to the barcode BC and stored in the database DBI. The barcode data BDA transfers the evaluation and transmitting function of the data entry module INM to the connection means TRI, along with an instruction to send this to the configuration device KMP.

In addition to the barcode BC, the data entry device IN also registers subscriber data SDA specific to the subscriber SUB, in this case the directory number or the name of the subscriber SUB, for example, that is assigned to the subscriber line SLT. The directory number is entered by the subscriber SUB at a keyboard of the input means KEY, for example. It is also possible for the subscriber SUB to speak the directory number and for the data entry device IN to record this with the aid of the microphone MIC and convert it into a numerical sequence with voice recognition software processed by the control means CPUI. The instructions that are required for entering the directory number are output to the loudspeaker SP by the data entry device IN via the display means DIS. The data entry device IN then transmits the directory number as subscriber data SDA to the configuration device KMP. The data entry module INM can send the barcode data BDA and the subscriber data SDA to the configuration device KMP as already interlinked data structures.

The configuration device KMP receives the barcode data BDA and the subscriber data SDA by means of a receive function of a configuration module KM, whose program code is executed by the control means CPUK. The configuration module KM is a program module which controls the configuration device KMP for registering and evaluating the barcode data BDA, as well as for subsequent configuration of the switching center SW. Via the directory number, the configuration module KM determines from a database DBK stored in the memory means MEMK, that the subscriber line SLT is served by the switching center SW, and by means of the barcode data BDA that the recently purchased terminal TER is an ISDN terminal and the "UUS3" and "Brokering" services are to be released. With the aid of data stored in the database DBK or in the program code of the configuration module KM, a configuration function of the configuration module KM thus determines configuration data KDA from the barcode data BDA. The configuration module KM transmits the configuration data KDA to the switching center SW by means of a transmitting function, which then sets up the subscriber line SLT as an ISDN subscriber line and releases the "UUS3" and "Brokering" services.

So that the recently set-up services can be billed by the telecommunication network NW, the configuration module KM also transmits the configuration data KDA to the call charge billing computer BIL. It is also possible for the configuration module KM to determine call charge configuration data KDB from the barcode data BDA, that is specially tailored to the call charge billing computer BIL, and to transmit to it. The switching center SW can therefore transmit call charges that are incurred for the use of the UUS3 service or other ISDN services, to the call charge billing computer BIL for billing for the subscriber SUB on the circuit VSB.

After the subscriber line SLT is suitably configured for the terminal TER, the switching center sends an acknowledgement to the configuration device KMP, which in turn acknowledges the successful configuration to the data entry device IN. The data entry device IN shows the acknowledgement on the display device DIS. However, it is also possible for the switching center SW or the configuration device KMP to send documentation concerning the newly configured services to the data entry device IN, which the data entry device IN forwards to a printer, not shown, for the printout for the subscriber SUB. Such documentation and/or operating instructions for the newly configured services can also be given on a receipt form for the subscriber SUB issued by the data entry device IN.

The new configuration can be active immediately or at a time entered at the data entry device IN, or only when the subscriber SUB has entered a release code at the data entry device IN or at the terminal TER recently connected to the subscriber line SLT, for example in the form of a secret code transmitted by DTMF (Dial Tone Multi Frequency).

However, the new configuration can only be active when a successful payment has been made. In order to handle a payment or billing transaction, the data entry device IN is connected to the accounting device ACC. This is, for example, a computer system designed for accounting purposes, to which the point-of-sale unit POS is connected. The accounting device ACC can, however, also be an accounting program module whose program code is executed by the control means CPUI of the data entry device IN. The accounting device ACC receives the barcode data BDA, or a portion of the barcode data BDA relevant to the accounting device ACC, from the data entry device IN via connection means TRA, for example an interface card for a LAN. From the barcode data BDA the accounting device ACC determines an account sum assigned to this barcode data, which in this case is comprised of the costs of changing over the subscriber line SLT to the services explained above, as well as the price of the terminal TER.

Furthermore, a credit card ID is inserted into the card reader RE, so that the data entry device IN can read the name and address of the subscriber SUB, as well as his credit card number, as subscriber data SDA from the credit card ID and transmit them to the accounting device ACC. The accounting device ACC then debits the account sum to an account of the subscriber SUB. It is also possible for the subscriber SUB to pay cash and for the accounting device ACC to enter the correct payment. After the accounting process has been successfully completed, the accounting device ACC sends an acknowledgement message to the data entry device IN. It is possible for the data entry device IN to send the barcode data BDA and the subscriber data SDA to the configuration device KMP only when it has received the acknowledgement message.

The accounting device ACC also sends the acknowledgement message concerning the completed accounting process, as well as the credit card number of the subscriber SUB, to the call charge billing computer BIL on a circuit VAB, so that the latter can then bill charges incurred for the use of the subscriber line SLT.

Furthermore, it is possible for the call charge billing computer BIL to send tariff data to the accounting device ACC, for example in connection with the purchase of a specific type of terminal or special tariffs associated with the booking of a specific telecommunication service. In this case the call charge billing computer BIL can send a credit note to the accounting device ACC for the changeover of the subscriber line SLT to ISDN, for example, which the accounting device ACC can set off against the purchase price to be charged for the terminal TER.

Following a successful accounting process and a successful configuration of the subscriber line SLT, the data entry device IN sends the data of the purchase of the terminal TER, as well as the associated telecommunication services, to a printer, not shown in FIG. 1, so that the subscriber SUB receives an acknowledgement of the entire process.

In a further variant, the terminal TER is a mobile radio terminal for which the subscriber line SLT, together with some services, is reconfigured. Barcodes BC of telecommunication services which can be used with the terminal TER are then arranged on the packaging of the terminal TER or a SIM (Subscriber Identity Module) card for the terminal TER, or on a list placed close to the data entry device IN. The barcodes BC are read in by the scanner SCAN and shown on the display device DIS. The subscriber SUB selects the telecommunication services he requires via the input means KEY, so that the data entry device IN can send the respective barcode data BDA of these services to the configuration device KMP for the new set-up for the subscriber line SLT. The subscriber SUB can, for example, enter a desired directory number, via the above-mentioned voice recognition system, whose availability or non-availability is then confirmed to the data entry device IN by the configuration device KMP.

Due to the interactive coupling between data entry device IN and configuration device KMP, it is possible for telecommunication services that are specially tailored to the type of terminal TER to be provided by the telecommunication network NW, and for a release and checking process specially tailored to the type of terminal TER to be implemented for the terminal TER. Check data for complete and plausible transmission of the barcode data BDA can likewise be reciprocally transmitted between data entry device IN and configuration device KMP.

Furthermore, a process optimisation of the distribution chain for telecommunication services termed "Efficient Consumer Response (ECR)" can be realised, by which the purchase and utilisation characteristic of telecommunication services of the subscriber SUB chosen as an example is recorded and evaluated, so that the respective customer requirement can be recognised and the individual demand covered by an optimised logistical chain.

In order to detect the functions of the data entry device IN according to the invention, the data entry module INM can also control a substantially known scanner if the scanner console is equipped with connection means TRI. According to the invention, the configuration module KM can control a substantially known configuration device, for example an operational computer of a telecommunication management network, if connection means TR1 are provided for this. Furthermore, the accounting device ACC can also be integrated in the data entry device IN.

The data entry device IN can also record a speech pattern of the subscriber SUB and send it to the configuration device KMP. By means of this speech pattern, the subscriber SUB can at a later date identify himself to the configuration device KMP via the terminal TER, for example at the above-mentioned release of the newly set-up services. Moreover, the subscriber SUB can at a later date set up new services interactively with the configuration device KMP via the terminal TER, or manipulate services that are already established. Here again the speech pattern can be used for subscriber SUB identification/authorisation.

In a further variant, a terminal barcode assigned to the terminal TER by the data entry device IN, as well as a service barcode that is assigned to a telecommunication service to be provided by the telecommunication network NW in conjunction with the terminal TER, are recorded. The data entry device IN and/or the configuration device KMP then check whether the terminal TER is designed for the telecommunication service, for example whether it has a display for displaying a CLIP (Calling Line Identification Presentation). For this, a bit stream obtained from the terminal barcode and a bit stream obtained from the service barcode are compared by means of an EXOR logic operation. The telecommunication service is then only set up if the terminal TER is designed for this.

What is claimed is:

1. A process for configuring a service that is to be provided for a subscriber terminal (SUB) by a telecommunication network (NW), in which a barcode (BC) is assigned to the service that is to be provided, the barcode (BC) is read in by a data entry device (IN) of a barcode tagger (TAG), the data entry device (IN) transmits barcode data (BDA), determined from the barcode (BC), to a configuration device (KMP) of the telecommunication network (NW), the data entry device (IN) also records the subscriber data (SDA) that are specific to the subscriber terminal (SUB), the data entry device (IN) also transmits the subscriber data (SDA) to the configuration device (KMP), and using both the barcode data (BDA) and also the subscriber data (SDA), the configuration device (KMP) configures the service for the subscriber terminal (SUB).

2. The process according to claim 1, characterised in that the data entry device (IN) transmits the barcode data (BDA), at least partially, to an accounting device (ACC), that the accounting device (ACC) determines an account sum that is assigned to the barcode data (BDA), and that the accounting device (ACC) enters the account sum.

3. The process according to claim 2, characterised in that the accounting device (ACC) sends an acknowledgement message concerning the completed accounting process to the telecommunication network (NW) and/or to the data entry device (IN).

4. The process according to claim 1, characterised in that the data entry device (IN) records the subscriber data (SDA) via a voice recognition device (MIC, CPU).

5. The process according to claim 1, characterised in that the barcode data (BDA), or call charge configuration data (KDB) determined from them, are transmitted to a call charge billing computer (BIL) of the telecommunication network (NW).

6. The process according to claim 1, characterised in that the telecommunication network (NW) releases the service in accordance with a release code, for the service, that is input by the subscriber terminal (SUB).

7. The process according to claim 1, wherein the subscriber data (SDA) include directory information of the subscriber (SUB).

8. The process according to claim 1, wherein the barcode (BC) is physically attached to the terminal or to packaging thereof or a label therefor.

9. A barcode tagger (TAG) for configuring a service that is to be provided for a subscriber terminal (SUB) by a telecommunication network (NW), characterised in that the barcode tagger (TAG) has a barcode (BC), for identifying the service that is to be provided, which can be read by a data entry device (IN), and that, using both barcode data (BDA), determined from the bar code, and also subscriber data (SDA) identifying a specific directory number of the subscriber, a configuration device (KMP) of the telecommunication network (NW) configures the service for the subscriber terminal (SUB).

10. The barcode tagger according to claim 9, wherein the barcode (BC) is physically attached to the terminal or to packaging thereof or a label therefor.

11. A configuration module (KM) for configuring a service that is to be provided for a subscriber terminal (SUB) by a telecommunication network (NW), characterised in that the configuration module (KM) contains program code that can be executed by control means of a configuration device (KMP), that the configuration module (KM) has a receive function for receiving both barcode data (BDA), determined by a data entry device (IN) from a barcode (BC), and also subscriber data (SDA), identifying a specific directory number of the subscriber, wherein the barcode (BC) is assigned to the service that is to be provided for the subscriber terminal (SUB), that the configuration module (KM) has a configuration function that is designed so that the configuration module (KM) can determine configuration data (KDA) for the configuration of the service for the subscriber (SUB) by means of the barcode data (BDA), and that the configuration module (KM) has a transmit function for transmitting the configuration data (KDA) to at least one node point (SW) of the telecommunication network (NW).

12. The configuration module according to claim 11, wherein the barcode (BC) is physically attached to the terminal or to packaging thereof or a label therefor.

13. A configuration device (KMP) for configuring a service that is to be provided for a subscriber terminal (SUB) by a telecommunication network (NW), characterised in that the configuration device (KMP) has receiving means (TR1) for receiving both barcode data (BDA), determined by a data entry device (IN) from a barcode (BC), and also subscriber data (SDM), A identifying a specific directory number of the subscriber, wherein the barcode (BC) is assigned to the service that is to be provided for the subscriber terminal (SUB), that the configuration device (KMP) has configuration means (CPUK, MEMK, DBK) that are designed so that the configuration device (KMP) can determine configuration data (KDA) for configuring the service for the subscriber terminal (SUB) by means of the barcode data (BDA), and that the configuration device (KMP) has transmitting means (TR2) for transmitting the configuration data (KDA) to at least one node point (SW) of the telecommunication network (NW).

14. The configuration device according to claim 13, wherein the barcode (BC) is physically attached to the terminal or to packaging thereof or a label therefor.

15. A data entry module (INM) for configuring a service that is to be provided for a subscriber terminal (SUB) by a telecommunication network (NW), characterised in that the data entry module (INM) contains program code that can be executed by control means (CPUI) of a data entry device (IN), that the data entry module (INM) has a read function that is designed so that the data entry module (INM) can read a barcode (BC) which is displayed on a barcode tagger (TAG), and which is assigned to the service that is to be provided, and that the data entry module (INM) has an evaluation and transmitting function that is designed so that the data entry module (INM) can transmit both barcode data (BDA), determined from the barcode (BC), and also subscriber data (SDA), identifying a specific directory number of the subscriber, to a configuration device (KMP) of the telecommunication network (NW), by means of which the configuration device (KMP) can configure the service for the subscriber terminal (SUB).

16. The data entry module according to claim 15, wherein the barcode (BC) is physically attached to the terminal or to packaging thereof or a label therefor.

17. A data entry device (IN) for configuring a service that is to be provided for a subscriber terminal (SUB) by a telecommunication network (NW), characterised in that the data entry device (IN) has reading means (SCAN) that are designed so that the data entry device (IN) can read a barcode (BC) displayed on a barcode tagger (TAG), and assigned to the service that is to be provided, and that the data entry device (IN) has evaluation and transmitting means (CPUI, TRI) that are designed so that the data entry module (INM) can transmit both barcode data (BDA), determined from the barcode (BC), and also subscriber data (SDA), identifying a specific directory number of the subscriber, to a configuration device (KMP) of the telecommunication network (NW), by means of which the configuration device (KMP) can configure the service for the subscriber terminal (SUB).

18. The data entry device according to claim 17, wherein the barcode (BC) is physically attached to the terminal or to packaging thereof or a label therefor.

* * * * *